(12) United States Patent
Kim et al.

(10) Patent No.: US 6,373,812 B2
(45) Date of Patent: Apr. 16, 2002

(54) DISK PLAYER CAPABLE OF ADJUSTING TILT OF OPTICAL PICKUP

(75) Inventors: Sang-tae Kim, Suwon; Chul-ho Jeon, Seoul, both of (KR)

(73) Assignee: Samsung Electronics Co., Ltd., Suwon (KR)

(*) Notice: Subject to any disclaimer, the term of this patent is extended or adjusted under 35 U.S.C. 154(b) by 0 days.

(21) Appl. No.: 09/221,111

(22) Filed: Dec. 28, 1998

(30) Foreign Application Priority Data

Dec. 29, 1997 (KR) .............................. 97-76370

(51) Int. Cl.[7] .............................................. G11B 21/02
(52) U.S. Cl. ....................................................... 369/219
(58) Field of Search ................................. 360/105, 106; 369/44.15, 44.14, 112, 195, 219, 220, 221, 224, 232; 359/819, 822

(56) References Cited

U.S. PATENT DOCUMENTS

| 4,279,423 A | * | 7/1981 | Rizzello ..................... 369/247 |
| 4,831,615 A | * | 5/1989 | Goto ........................... 369/223 |
| 5,172,361 A | * | 12/1992 | Urushibata et al. ......... 369/77.1 |
| 5,191,575 A | * | 3/1993 | Kido ........................... 369/223 |
| 5,267,089 A | * | 11/1993 | Yamamoto et al. ......... 359/822 |
| 5,311,497 A | * | 5/1994 | Takizawa et al. ........... 369/219 |
| 5,381,273 A | * | 1/1995 | Goda .......................... 359/827 |
| 5,453,972 A | * | 9/1995 | Kanazawa et al. .......... 369/219 |
| 5,682,282 A | * | 10/1997 | Kato .......................... 360/266.3 |
| 5,708,646 A | * | 1/1998 | Furusawa .................... 369/112 |
| 5,729,510 A | * | 3/1998 | Kasahara et al. ......... 369/44.14 |
| 5,995,479 A | * | 11/1999 | Takizawa et al. ........... 369/219 |
| 6,052,358 A | * | 4/2000 | Morikawa et al. .......... 369/219 |
| 2001/0012261 A | * | 12/1998 | Kim et al. ................... 369/219 |

FOREIGN PATENT DOCUMENTS

| JP | 61-168180 | * | 7/1986 |
| JP | 63-87611 | | 6/1988 |
| JP | 2-94115 | * | 4/1990 |
| JP | 11250595 A | * | 9/1999 |
| JP | 2001052346 A | * | 2/2001 |
| JP | 2001101673 A | * | 4/2001 |
| JP | 2001155360 A | * | 6/2001 |
| KR | 95-31363 | | 11/1995 |

* cited by examiner

Primary Examiner—William Klimowicz
Assistant Examiner—Tianjie Chen
(74) Attorney, Agent, or Firm—Staas & Halsey LLP

(57) ABSTRACT

In a disk player, an optical pickup unit which is supported by guide shafts installed on a base records/reproduces information by emitting an optical beam onto a disk while moving along the guide shafts. A lead screw which is rotated by a transfer motor transfers a driving force to move the optical pickup unit. A tilt of the optical pickup unit is adjusted by an adjustment portion which moves up and down first ends of the guide shafts. A power transfer portion has a threaded portion which is to be coupled to the lead screw and installed at the optical pickup unit to be capable of relatively rotating with respect to the optical pickup unit. As the optical pickup unit moves up or down, the power transfer portion and the optical pickup unit rotate relative to each other so that the gear engagement state between the threaded portion and the lead screw can be maintained.

20 Claims, 4 Drawing Sheets

DISK PLAYER CAPABLE OF ADJUSTING TILT OF OPTICAL PICKUP

CROSS-REFERENCE TO RELATED APPLICATIONS

This application claims the benefit of Korean Application No. 97-76370, filed Dec. 29, 1997, in the Korean Patent Office, the disclosure of which is incorporated herein by reference.

BACKGROUND OF THE INVENTION

1. Field of the Invention

The present invention relates to a disk player which is capable of adjusting a tilt of an optical pickup.

2. Description of the Related Art

In a typical disk player, an optical pickup records/reproduces information by emitting beams onto an optical disk, while moving across the optical disk.

FIG. 1 shows a conventional disk player adopted in a notebook computer. As shown in the drawing, the disk player is provided with a disk tray 10, where a disk 19 is placed, moving in and out of a main body 11. A turntable 15, on which the disk 19 is placed to rotate, and an optical pickup unit 14, which emits optical beams onto the disk 19 to read information, are installed at the disk tray 10. The optical pickup unit 14, which is supported by a lead screw 18, moves across the disk 19 driven by a transfer motor 16.

In order to accurately record/reproduce information on/from the disk 19, the optical pickup unit 14 is required to emit beams perpendicular to a recording surface of the disk 19. However, due to errors in assembling a disk player or in manufacturing parts thereof, the optical beam emitted from the optical pickup unit 14 often does not land perpendicular to the recording surface of the disk 19. Thus, for the accurate recording/reproducing of information, means to adjust a tilt of an optical pickup is needed. Further, the adjustment means should not cause damage to the assembled state of the lead screw 18 and the optical pickup unit 14, or disturb the smooth operation thereof. That is, means to adjust a tilt of the optical pickup is needed which can maintain a normal state of a transfer mechanism of the optical pickup.

SUMMARY OF THE INVENTION

It is an object of the present invention to provide a disk player having an improved structure which can adjust a tilt of an optical pickup unit so that an optical beam can be emitted which is perpendicular to a disk while concurrently maintaining a lead screw and a gear for transferring an optical pickup unit in a normal engaged state.

Additional objects and advantages of the invention will be set forth in part in the description which follows and, in part, will be obvious from the description, or may be learned by practice of the invention.

Accordingly, to achieve the above and other objects of the present invention, there is provided a disk player which includes: an optical pickup unit supported by guide shafts installed on a base for recording/reproducing information by emitting an optical beam onto a disk while moving along the guide shafts; a lead screw, rotated by a transfer motor, for transferring a driving force to move the optical pickup unit; an adjustment portion for adjusting a tilt of the optical pickup unit by moving up and down first ends of the guide shafts; and a power transfer portion having a threaded portion to be coupled to the lead screw and installed at the optical pickup unit to be capable of relatively rotating with respect to the optical pickup unit. In the disk player, as the optical pickup unit moves up or down, the power transfer portion and the optical pickup unit rotate relative to each other so that the gear engagement state between the threaded portion and the lead screw can be maintained.

It is preferable in the present invention that the adjustment portion includes: a cam member rotatably installed at the base and having a cam groove formed aslant along the outer circumferential surface thereof such that first ends of the guide shafts are inserted therein; and a support block supporting the second end of each of the guide shafts.

Also, it is preferable in the present invention that the power transfer portion includes: a frame fixed to one side of the optical pickup unit; and a pivot member coupled to the frame to be capable of relatively rotating and having a threaded portion formed thereon which is engaged with the lead screw.

BRIEF DESCRIPTION OF THE DRAWINGS

These other objects and advantages of the invention will become apparent and more readily appreciated from the following description of the preferred embodiment, taken in conjunction with the accompanying drawings of which.

DETAILED DESCRIPTION OF THE INVENTION

Figure 1:
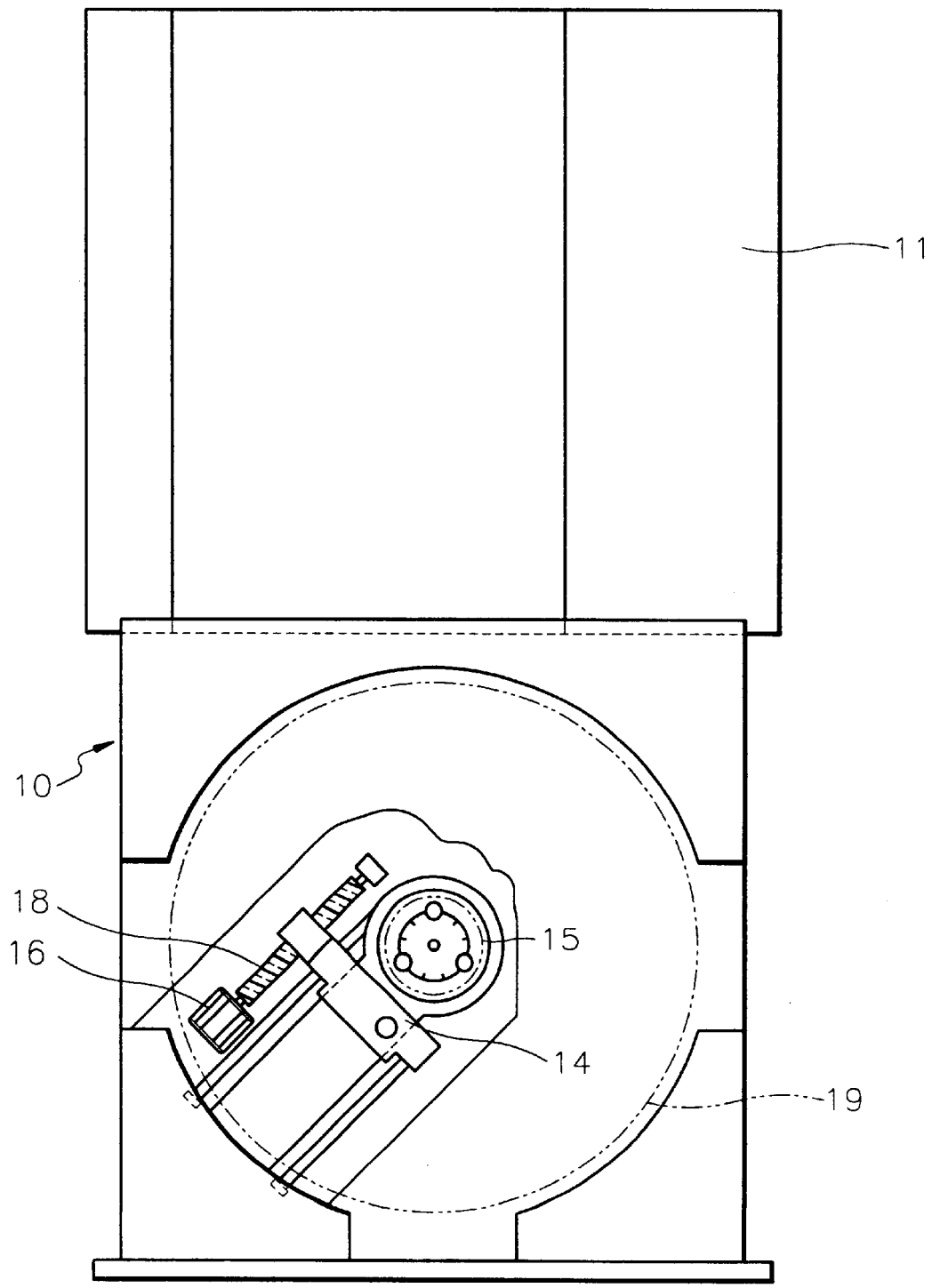
FIG. 1 is a plan view illustrating a partially cut-away conventional disk player.

Reference will now be made in detail to the present preferred embodiment of the present invention, examples of which are illustrated in the accompanying drawings wherein like reference numerals refer to like elements throughout. The embodiment is described below in order to explain the present invention by referring to the figures.

Figure 2:
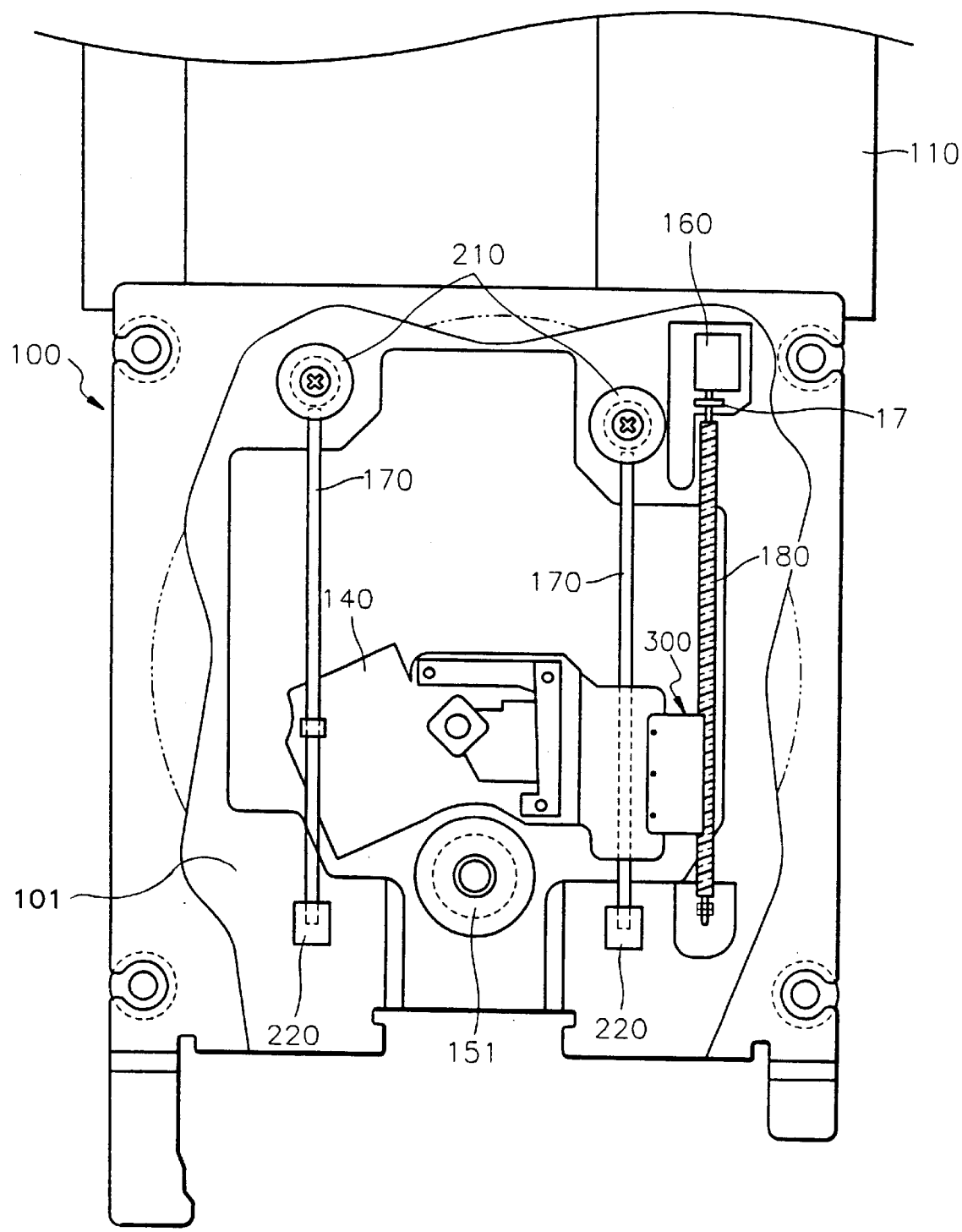
FIG. 2 is a plan view illustrating a partially cut-away disk player according to an embodiment of the present invention.

Referring to FIG. 2, a disk player according to an embodiment of the present invention includes a main body 110, a base 101 and a disk tray 100 which moves in and out of the main body 110 and where a disk (not shown) is placed. In the case of a notebook computer where the disk player is slim (as shown in the embodiment of the present invention), the base 101 is installed on the disk tray 101. However, in the case of a normal disk player, such as one for a desktop computer, the base 101 is installed in the main body 110.

The base 101 has mounted thereon a turntable 151, which supports and rotates the disk, an optical pickup unit 140 which records/reproduces information by emitting a beam onto the disk, and a pair of guide shafts 170, which support the optical pickup unit 140 so that it is capable of sliding across the disk.

A lead screw 180, which is rotated by a transfer motor 160, is installed at one side of the optical pickup unit 140. The optical pickup unit 140 is coupled to the lead screw 180 by a power transfer portion 300, which will be described later, and moves along the guide shafts 170 according to the rotation of the lead screw 180.

Figure 3:
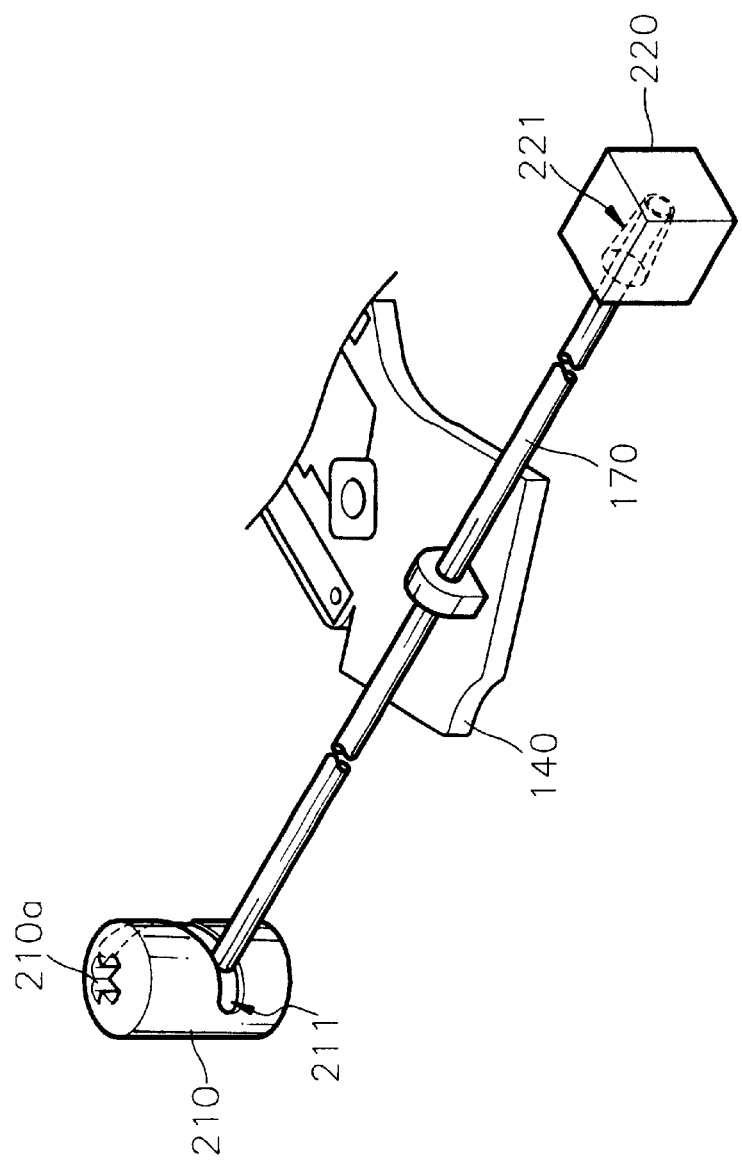
FIG. 3 is a perspective view illustrating adjuster adopted in the disk player shown in FIG. 2.

Adjustment means includes adjusters for adjusting a tilt of the optical pickup unit 140 by moving an end portion of each of the guide shafts 170 up and down are installed at the base 101, wherein one of the adjusters is shown in FIG. 3. The description which follows is the same for each of the adjusters positioned at ends of each of the guide shafts. As shown in the drawing, each adjuster includes a cam member 210 which is coupled to a first end of a guide shaft 170 to move the first end of the guide shaft 170 up and down and a support block 220 installed to support the second end of the guide shaft 170. A cam groove 211, into which the first end of the guide shaft 170 is inserted, is formed to be aslant along the outer circumferential surface of the cam member 210. Accordingly, as the cam member 210 rotates, the first end of the guide shaft 170 slides along the cam groove 211 and can ascend and descend.

A support hole 221, into which the second end of the guide shaft 170 is inserted, is formed at one side of the support block 220. It is preferable that the support hole 221 is formed to have a truncated conic shape so that the second end of the guide shaft 170 can slightly move corresponding to the movement of the first end of the guide shaft 170.

Figure 4:
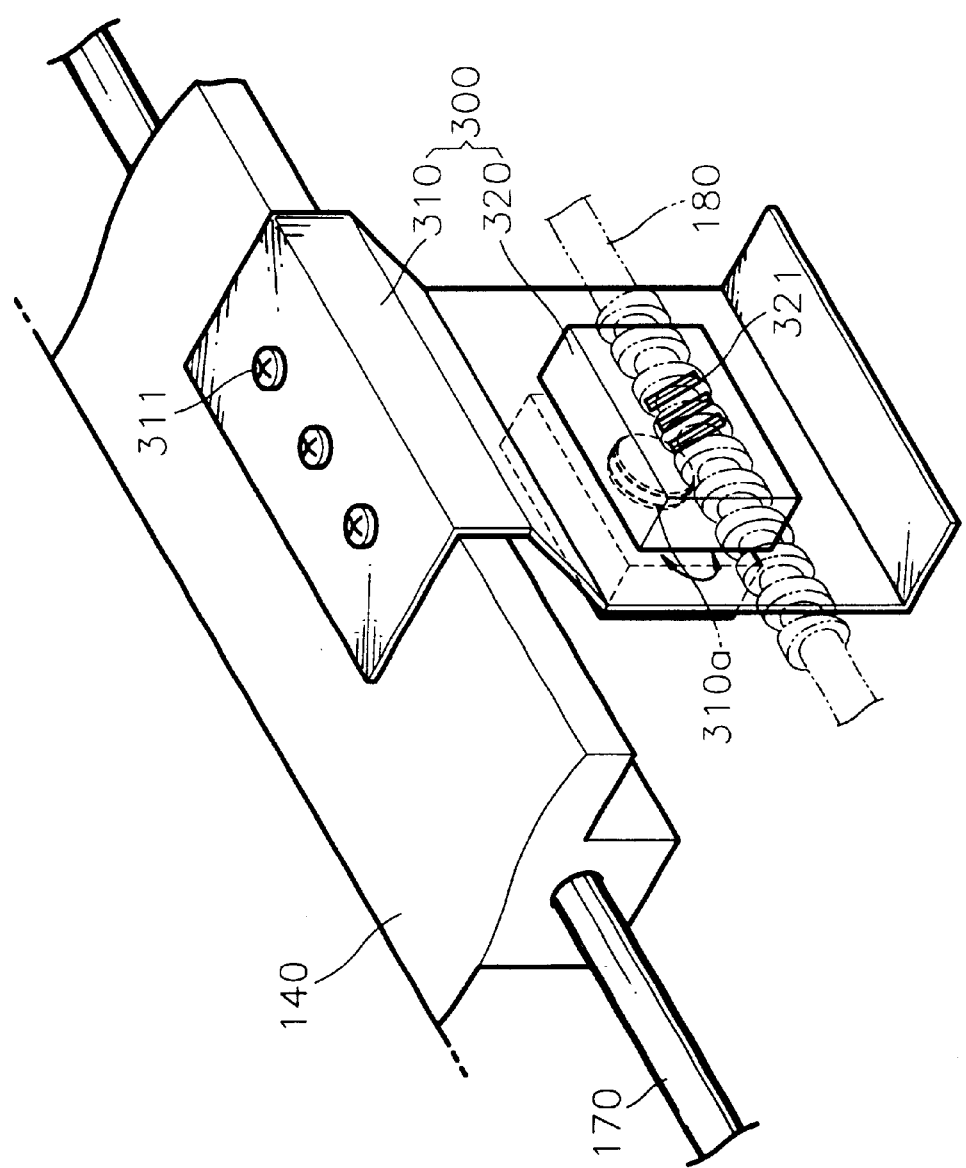
FIG. 4 is a perspective view illustrating a power transfer portion adopted in the disk player shown in FIG. 2.

FIG. 4 shows the configuration of the power transfer portion 300 positioned next to the lead screw 180 and adjacent to one of the guide shafts 170.

The power transfer portion 300 includes a frame 310 coupled by screws 311 at the side surface of the optical pickup unit 140 and a pivot member 320 coupled to the frame 310 to be capable of pivoting. The frame 310 is manufactured by bending a high elastic metal plate. The pivot member 320 is coupled to a hole 310a formed at the center of the frame 310 through an injection molding method. Accordingly, the pivot member 320 can pivot in a direction indicated by an arrow with respect to the center of the hole 310a. Also, a threaded portion 321, which gears with the lead screw 180, is formed at one side of the pivot member 320.

As shown in FIGS. 3 and 4, in a disk player having the above structure according to the embodiment of the present invention, the cam member 210 is rotated to adjust a tilt of the optical pickup unit 140. A screw-driver groove 210a is formed on the top surface of the cam member 210 so that the cam member 210 can be rotated by using a screw driver. As the cam member 210 rotates, the first end of the guide shaft 170 slides along the cam groove 211 and rises. Thus, a tilt of the optical pickup unit 140, supported by the guide shaft 170, changes.

Then, the frame 310, coupled to the optical pickup unit 140, pivots slightly in a direction indicated by the arrow shown in FIG. 4 according to a change in the slant of the optical pickup unit 140. Here, since the pivot member 320 is engaged with the lead screw 180, the pivot member 320 and the frame 310 are rotated relative to each other. Thus, the normal gear engagement between the pivot member 320 and the lead screw 180 can be maintained.

As described above, in the disk player according to the embodiment of the present invention, a tilt of the optical pickup unit can be adjusted such that a beam emitted from the optical pickup unit can perpendicularly land on the surface of the disk and, concurrently, a mechanism to transfer the optical pickup unit can be maintained in a normal state.

In the present preferred embodiment above, although the optical pickup unit, which is installed at the base of the disk player is described, it would be obvious to adopt the subject embodiment in an optical pickup unit installed inside a main body of a typical disk player.

Although one preferred embodiment of the present invention has been shown and described, it would be appreciated by those skilled in the art that changes may be made in this embodiment without departing from the principles and spirit of the invention, the scope of which is defined in the claims and their equivalents.

What is claimed is:

1. A disk player to record and/or reproduce information to/from a disk, comprising:
   an optical pickup unit, supported by guide shafts installed on a base, to record and/or reproduce the information by emitting an optical beam onto the disk while moving along the guide shafts;
   a transfer motor;
   a lead screw rotated by said transfer motor, to transfer a driving force of said transfer motor to move said optical pickup unit in a first direction;
   adjustment means for adjusting a tilt of said optical pickup unit by moving first ends of the guide shafts up and down in a second direction; and
   a power transfer portion comprising a threaded portion coupled to said lead screw, said power transfer portion being installed at said optical pickup unit to be capable of relatively rotating the threaded portion with respect to said optical pickup unit,
   wherein, as said optical pickup unit moves up or down, the threaded portion of said power transfer portion and said optical pickup unit rotate relative to each other about an axis perpendicular to both the first and second direcions so that a gear engagement state between the threaded portion and said lead screw is maintained.

2. The disk player as claimed in claim 1, wherein said adjustment means comprises:
   first and second cam members rotatably installed at the base and each having a cam groove formed aslant along an outer circumferential surface thereof such that first ends of the guide shafts are inserted therein, respectively; and
   first and second support blocks respectively supporting second ends of each of the guide shafts.

3. The disk player as claimed in claim 2, wherein each of said support blocks has a hole having a truncated conic shape formed therein, to respectively support the second ends of the guide shafts.

4. A disk player to record and/or reproduce information to/from a disk, comprising:
   an optical pickup unit, supported by guide shafts installed on a base, to record and/or reproduce the information by emitting an optical beam onto the disk while moving along the guide shafts;
   a transfer motor;
   a lead screw rotated by said transfer motor, to transfer a driving force of said transfer motor to move said optical pickup unit;
   adjustment means for adjusting a tilt of said optical pickup unit by moving first ends of the guide shafts up and down; and
   a power transfer portion comprising a threaded portion coupled to said lead screw, said power transfer portion being installed at said optical pickup unit to be capable of relatively rotating the threaded portion with respect to said optical pickup unit,
   wherein
      as said optical pickup unit moves up or down, the threaded portion of said power transfer portion and said optical pickup unit rotate relative to each other so that a gear engagement state between the threaded portion and said lead screw is maintained, and said power transfer portion comprises:
  a frame fixed to a side of said optical pickup unit; and
  a pivot member rotatably coupled to said frame and having the threaded portion formed thereon which is engaged with said lead screw.

5. The disk player as claimed in claim 4, wherein the threaded portion rotates relative to the guide shafts, and does not rotate relative to said lead screw.

6. The disk player as claimed in claim 4, wherein the threaded portion rotates relative to said frame, and does not rotate relative to said lead screw.

7. The disk player as claimed in claim 6, wherein the threaded portion rotates relative to said optical pickup unit.

8. A disk player, comprising:
  a base;
  a transfer motor installed on said base;
  a power transfer portion comprising a pivot member and a frame, wherein the pivot member is rotatably connected to the frame;
  a lead screw rotated by said transfer motor and connected to the pivot member;
  a plurality of guide shafts installed on said base;
  an optical pickup unit supported by said plurality of guide shafts and coupled to said lead screw by the frame of said power transfer portion, said optical pickup unit emitting an optical beam onto a disk and moving along the guide shafts according to a rotation of said lead screw;
  first and second cam members each having a cam groove formed aslant along an outer circumferential surface thereof, said first and second cam members coupled to respective first ends of each of said guide shafts and moving the first ends of said guide shafts in an upward and downward direction; and
  first and second support blocks each supporting a respective second end of said plurality of guide shafts.

9. The disk player as claimed in claim 8, wherein the pivot member is threaded to receive said lead screw.

10. The disk player as claimed in claim 8, wherein said plurality of guide shafts pass through said optical pickup unit so as to slideably support said optical pickup unit, and wherein the frame is non-rotatably attached to said optical pickup unit.

11. The disk player as claimed in claim 8, wherein the pivot member rotates relative to said plurality of guide shafts, and does not rotate relative to said lead screw.

12. The disk player as claimed in claim 11, wherein the pivot member is threaded to receive said lead screw.

13. The disk player as claimed in claim 12, wherein said plurality of guide shafts pass through said optical pickup unit so as to slideably support said optical pickup unit, and wherein the frame is non-rotatably attached to said optical pickup unit.

14. A disk player to record and/or reproduce information to/from a disk, comprising:
  a guide unit;
  an optical pickup unit guided by said guide unit along a first direction;
  an adjustment unit to shift the guide unit, to adjust a tilt of said optical pickup unit relative to the disk in a second direction;
  a power driver circuit fixed relative to the disk having a gear portion and generating a driving force; and
  a power transfer unit connected to said optical pickup unit, and having a rotatable threaded portion engaged with said gear portion, to rotate in response to the tilting of said optical pickup unit about an axis perpendicular to the first and second directions to maintain a constant engagement with said gear portion, thereby transferring the driving force from said gear portion to said optical pickup unit.

15. A disk player to record and/or reproduce information to/from a disk, comprising:
  an optical pickup unit, supported by guide shafts installed on a base, to record and/or reproduce the information by emitting an optical beam onto the disk while moving along the guide shafts;
  a transfer motor;
  a lead screw rotated by said transfer motor, to transfer a driving force of said transfer motor to move said optical pickup unit;
  adjustment means for adjusting a tilt of said optical pickup unit by moving first ends of the guide shafts up and down; and
  a power transfer portion comprising a threaded portion coupled to said lead screw, said power transfer portion being installed at said optical pickup unit to be capable of relatively rotating the threaded portion with respect to said optical pickup unit,
  wherein
    as said optical pickup unit moves up or down, the threaded portion of said power transfer portion and said optical pickup unit rotate relative to each so that a gear engagement state between the threaded portion and said lead screw is maintained, and
    the threaded portion rotates relative to the guide shafts, and does not rotate relative to said lead screw.

16. A disk player to record and/or reproduce information to/from a disk, comprising:
  a guide unit;
  an optical pickup unit guided by said guide unit;
  an adjustment unit to shift the guide unit, to adjust a tilt of said optical pickup unit relative to the disk;
  a power driver circuit fixed relative to the disk having a gear portion and generating a driving force; and
  a power transfer unit connected to said optical pickup unit, and having a rotatable threaded portion engaged with said gear portion, to rotate in response to the tilting of said optical pickup unit to maintain a constant engagement with said gear portion, thereby transferring the driving force from said gear portion to said optical pickup unit,
  wherein the threaded portion rotates relative to said guide unit, and does not rotate relative to said gear portion.

17. A disk player to record and/or reproduce information to/from a disk, comprising:
  a guide unit;
  an optical pickup unit guided by said guide unit;
  an adjustment unit to shift the guide unit, to adjust a tilt of said optical pickup unit relative to the disk;
  a power driver circuit fixed relative to the disk having a gear portion and generating a driving force; and
  a power transfer unit connected to said optical pickup unit, and having a rotatable threaded portion engaged with said gear portion, to rotate in response to the tilting of said optical pickup unit to maintain a constant engagement with said gear portion, thereby transferring the driving force from said gear portion to said optical pickup unit, wherein said guide unit passes through said optical pickup unit so as to slideably support said optical pickup unit, and wherein said power transfer unit further comprises a frame that is rotatably attached to the threaded portion and non-rotatably attached to said optical pickup unit.

18. The disk player as claimed in claim 17, wherein the threaded portion rotates relative to the frame, and does not rotate relative to said gear portion.

19. The disk player as claimed in claim 18, wherein the threaded portion further rotates relative to said guide unit.

20. The disk player as claimed in claim 17, wherein the threaded portion rotates relative to said guide unit, and does not rotate relative to said gear portion.

* * * * *